US 8,578,259 B2

(12) United States Patent
Chen et al.

(10) Patent No.: US 8,578,259 B2
(45) Date of Patent: Nov. 5, 2013

(54) MEDIA PORTABILITY AND COMPATIBILITY FOR DIFFERENT DESTINATION PLATFORMS

(75) Inventors: Jeffrey Chao-Nan Chen, Mountain View, CA (US); Barn-Wan Li, San Jose, CA (US); Kai Chung Lui, Hong Kong (CN)

(73) Assignee: Microsoft Corporation, Redmond, WA (US)

(*) Notice: Subject to any disclaimer, the term of this patent is extended or adjusted under 35 U.S.C. 154(b) by 422 days.

(21) Appl. No.: 12/346,844

(22) Filed: Dec. 31, 2008

(65) Prior Publication Data

US 2010/0169753 A1 Jul. 1, 2010

(51) Int. Cl.
*G06F 17/00* (2006.01)

(52) U.S. Cl.
USPC ........... 715/201; 715/204; 715/731; 709/231; 709/246; 375/240.01; 375/240.02; 375/240.16; 348/557

(58) Field of Classification Search
USPC .................. 715/201, 204, 731; 709/231, 246; 375/240.01, 240.02, 240.16; 348/557
See application file for complete search history.

(56) References Cited

U.S. PATENT DOCUMENTS

| 5,911,776 | A  | * | 6/1999  | Guck ............................ 709/217 |
| 5,928,330 | A  | * | 7/1999  | Goetz et al. .................... 709/231 |
| 6,177,946 | B1 | * | 1/2001  | Sinclair et al. ................. 345/501 |
| 6,498,865 | B1 |   | 12/2002 | Brailean et al. |
| 7,296,295 | B2 | * | 11/2007 | Kellerman et al. ............. 726/26 |
| 7,383,502 | B2 |   | 6/2008  | Shur et al. |
| 8,028,093 | B2 | * | 9/2011  | Karaoguz et al. ............. 709/246 |
| 8,086,445 | B2 | * | 12/2011 | Wold et al. ..................... 704/200 |
| 8,145,722 | B2 | * | 3/2012  | Koons et al. ................... 709/206 |
| 8,321,905 | B1 | * | 11/2012 | Streeter et al. ................ 725/134 |
| 8,381,110 | B2 | * | 2/2013  | Barger et al. .................. 715/736 |
| 2002/0097433 | A1 | * | 7/2002 | Chang et al. ................. 358/1.15 |
| 2003/0050062 | A1 | * | 3/2003 | Chen et al. .................... 455/435 |
| 2003/0110234 | A1 | * | 6/2003 | Egli et al. ..................... 709/217 |
| 2003/0158913 | A1 |   | 8/2003 | Agnoli et al. |
| 2003/0225723 | A1 | * | 12/2003 | Agarwalla et al. ............. 707/1 |
| 2004/0162818 | A1 | * | 8/2004 | Shaw .............................. 707/3 |

(Continued)

FOREIGN PATENT DOCUMENTS

CN 1488195 A 4/2004
CN 1513249 A 7/2004

(Continued)

OTHER PUBLICATIONS

Apple Computers Inc. , Keynote 2 Users Guide, 2005, Apple, pp. 7,10,50-52.*

(Continued)

*Primary Examiner* — Kyle Stork
*Assistant Examiner* — Mario M Velez-Lopez
(74) *Attorney, Agent, or Firm* — Hope Baldauff, LLC

(57) ABSTRACT

Tools and techniques for media portability and compatibility for different destination platforms are provided. These tools may receive commands to launch a media portability capability, and may receive source media as input for transformation. These tools may also receive indications of profile settings for specifying how to transform the source media for enhanced portability on destination systems for playback. The source media may be transformed in response to the profile setting, with the transformed media inserted into a document. The tools may then distribute the document to the destination system for playback.

11 Claims, 4 Drawing Sheets

(56) References Cited

U.S. PATENT DOCUMENTS

| | | | |
|---|---|---|---|
| 2004/0215757 A1* | 10/2004 | Butler | 709/223 |
| 2005/0125734 A1* | 6/2005 | Mohammed et al. | 715/731 |
| 2005/0129110 A1 | 6/2005 | Marquant et al. | |
| 2005/0182855 A1* | 8/2005 | Apostolopoulos et al. | 709/247 |
| 2005/0226324 A1* | 10/2005 | Ouyang et al. | 375/240.12 |
| 2006/0265476 A1* | 11/2006 | Barger et al. | 709/219 |
| 2007/0094583 A1 | 4/2007 | Randall et al. | |
| 2007/0214410 A1 | 9/2007 | Ro et al. | |
| 2007/0226365 A1* | 9/2007 | Hildreth et al. | 709/231 |
| 2008/0007751 A1* | 1/2008 | Miyazawa | 358/1.9 |
| 2008/0107170 A1* | 5/2008 | Ong et al. | 375/240.01 |
| 2008/0134012 A1* | 6/2008 | Kokes et al. | 715/201 |
| 2008/0205389 A1 | 8/2008 | Fang et al. | |
| 2009/0028428 A1* | 1/2009 | Dovstam et al. | 382/166 |
| 2009/0080870 A1* | 3/2009 | Mudie et al. | 386/131 |
| 2010/0162117 A1* | 6/2010 | Basso et al. | 715/716 |
| 2010/0223354 A1* | 9/2010 | Wei et al. | 709/217 |
| 2010/0227550 A1* | 9/2010 | Chang et al. | 455/39 |
| 2012/0117274 A1* | 5/2012 | Lydon et al. | 710/5 |

FOREIGN PATENT DOCUMENTS

| | | |
|---|---|---|
| EP | 1701543 A1 | 9/2006 |
| JP | 2002-342218 A | 11/2002 |
| JP | 2002-354443 A | 12/2002 |
| JP | 2008-544412 A | 12/2008 |
| KR | 10-2008-0011986 | 2/2008 |
| WO | WO 2007/002448 A1 | 1/2007 |
| WO | WO 2008/030302 A1 | 3/2008 |

OTHER PUBLICATIONS

"Video Converter", http://forums.afterdawn.com/thread_view.cfm/268285, Dec. 30, 2006, pp. 1-6.*

"Mp4cam2avi" http://mp4cam2avi.sourceforge.net/interface.htm, Jul. 4, 2008 pp. 1-7.*

"Xilisoft FAQ", http://www.xilisoft.com/video-converter/faq.html Oct. 30, 2007, pp. 1-6.*

Macworld http://www.macworld.com/article/1047473/ipodpsp.html Oct. 14, 2005, pp. 1-5.*

Erol, et al., "Multimedia Thumbnails for Documents", retrieved at <<http://delivery.acm.org/10.1145/1190000/1180701/p231-erol.pdf key1=1180701&key2=2463693221&coll=GUIDE&dl=GUIDE&CFID=6176072&CFTOKEN=33334090>>, Oct. 23-27, 2006, pp. 231-240.

Christodoulakis, et al., "Multimedia Document Presentation, Information Extraction, and Document Formation in MINOS: A Model and a System", retrieved at <<http://delivery.acm.org/10.1145/10000/9764/p345-christodoulakis.pdf?key1=9764&key2=4773693221&coll=GUIDE&dl=GUIDE&CFID=6337754&CFTOKEN=91970399>>, ACM Transactions on Office Information Systems, vol. 4, No. 4, Oct. 1986, pp. 345-383.

"Transform the Way you Work and Play", retrieved at <<http://mediaplex.typepad.com/>>, Sep. 2, 2008, pp. 1-22.

Moura, et al., "Retrieving Quality Video across Heterogeneous Networks. Video over Wireless", retrieved at <<http://ieeexplore.ieee.org/stamp/stamp.jsp?arnumber=486975&isnumber=10424>>, IEEE Personal Communications, Feb. 1996, pp. 44-54.

International Search Report dated Jul. 14, 2011 in International Application PCT/US2009/064589.

Chinese Official Action dated Dec. 31, 2012 in Chinese Application No. 200980153754.8.

Garside, Alwin, "Converting MP4 video for the PSP (h264/AVC) on Linux with the software avidemux," Feb. 24, 2008, retrieved from http://blog.yogarine.com/2008_02_01_archive.htm, 12 pp.

"How to rip DVDs in Windows/Mac using Handbrake," Oct. 3, 2008, retrieved from http://www.my-guides.net/en/content/view/111/26/, 18 pp.

European Search Report dated Nov. 23, 2012 in European Application No. 09836595.0.

Chinese Official Action dated Jul. 1, 2013 in Chinese Application No. 200980153754.8.

Japanese Official Action dated Jun. 5, 2013 in Japanese Application No. 2011-543522.

* cited by examiner

MEDIA PORTABILITY AND COMPATIBILITY FOR DIFFERENT DESTINATION PLATFORMS

BACKGROUND

Playing a given media file on a computer system typically involves having appropriate technical infrastructure installed on that computer system. For example, this technical infrastructure may include a codec to decode and render the file on that computer system. Managing this technical infrastructure can be difficult and unwieldy, particularly for technically unsophisticated users. Sometimes, particular codecs may be difficult to locate, install, and manage. Without the appropriate technical infrastructure, the media will not play on the given computer system. Another concern is that in corporate or enterprise environments, administrators may lock down individual computer systems, preventing users from loading additional technical infrastructure onto the systems. Therefore, these users may be unable to load the appropriate codec, even if they can locate it.

SUMMARY

Tools and techniques for media portability and compatibility for different destination platforms are provided. These tools may receive commands to launch a media portability capability, and may receive source media as input for transformation. These tools may also receive indications of profile settings for specifying how to transform the source media for enhanced portability on destination systems for playback. The source media may be transformed in response to the profile setting, with the transformed media inserted into a document. The tools may then distribute the document to the destination system for playback It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
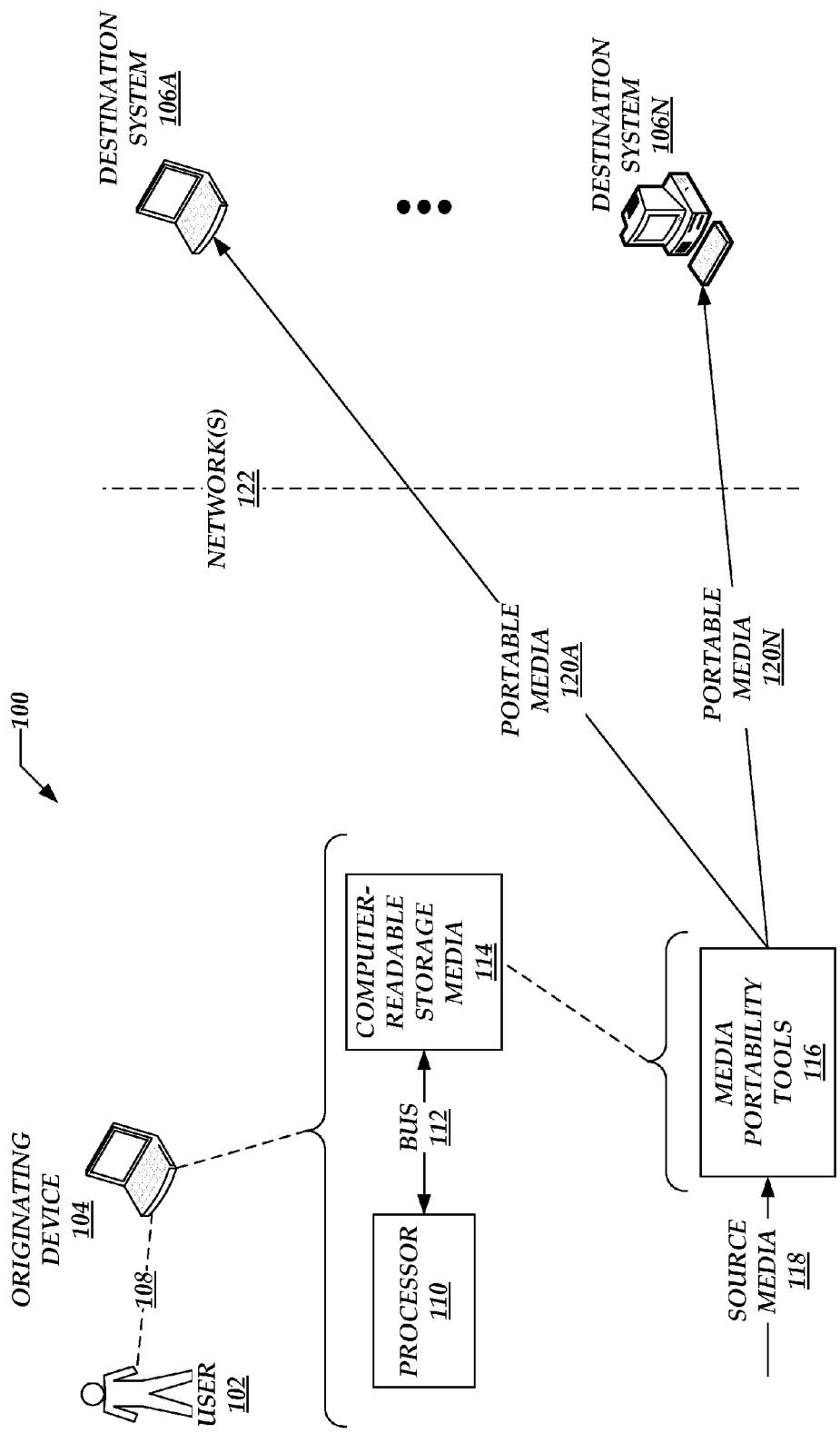
FIG. 1 is a combined block and flow diagram illustrating systems or operating environments suitable for implementing media portability and compatibility for different destination platforms.

The following detailed description provides tools and techniques for media portability and compatibility for different destination platforms. While the subject matter described herein presents a general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The following detailed description refers to the accompanying drawings that form a part hereof, and that show, by way of illustration, specific example implementations. Referring now to the drawings, in which like numerals represent like elements through the several figures, this description provides various tools and techniques for asynchronous database updates between collaborative applications and search utilities.

FIG. 1 illustrates systems or operating environments, denoted generally at 100, suitable for implementing media portability and compatibility for different destination platforms. Turning to FIG. 1 in more detail, any number of users 102 may interact with corresponding user devices 104, the user devices 104, configured as described herein, may enable the users 102 to create or edit documents that contain multimedia for distribution to any number of different devices 106a and 106n (collectively, devices 106). Accordingly, without limiting possible implementations, this description may refer to the user devices 104 as originating devices or origin devices, and may refer to the devices 106 as destination devices or platforms.

FIG. 1 denotes at 108 interactions between the users 102 and the originating devices 106a and 106n. In general, these interactions 108 may represent commands issued by the users to the originating devices 104, responses to these commands, and the like, in connection with providing media portability and compatibility for different destination platforms as described herein.

Turning to the user devices 104 in more detail, these user devices 104 as shown in FIG. 1 may represent any number of such devices. In addition, the graphical representations of the user devices 104 as presented in FIG. 1 are chosen only for convenience of illustration, but not to limit possible implementations. More specifically, the user devices 104 may include, but are not limited to: relatively stationary desktop computing systems; laptop notebook, or other relatively mobile computing systems; wireless communications devices, such as cellular phones, smartphones, wireless-enabled personal digital assistants (PDAs), or other similar communications devices.

Turning to the user devices 104 in more detail, these devices may include one or more processors 110, which may have a particular type or architecture, chosen as appropriate for particular implementations. The processor 110 may couple to one or more bus systems 112, having type and/or architecture that is chosen for compatibility with the processor 110.

The user devices 104 may also include one or more instances of computer-readable storage medium or media 114, which couple to the bus systems 112. The bus systems 112 may enable the processors 110 to read code and/or data to/from the computer-readable storage media 114. The media 114 may represent apparatus in the form of storage elements that are implemented using any suitable technology, including but not limited to semiconductors, magnetic materials, optics, or the like. The media 114 may include memory components, whether classified as RAM, ROM, flash, or other types, and may also represent hard disk drives.

The storage media 114 may include one or more modules of instructions that, when loaded into the processor 110 and executed, cause the user devices 104 to perform various techniques related to media portability and compatibility for different destination platforms. As detailed throughout this description, these modules of instructions may also provide various tools or techniques by which the user devices 104 may provide for media portability and compatibility for different destination platforms, using the components, flows, and data structures discussed in more detail throughout this description. For example, the storage media 114 may include one or more software modules that implement media portability tools 116.

Turning to the media portability tools 116 in more detail, in overview, the portability tools 116 may receive source media 118 as input. Examples of the source media 118 may include video, audio, or combinations of the foregoing, referred to collectively as multimedia. Typically, the originating devices 104 include any players or editors appropriate for displaying and/or editing the source media 118. In addition, the originating devices 104 may include any specialized tools for rendering or manipulating the source media (e.g., media coder-decoder utilities or codecs, or the like). However, the destination devices 106 may or may not include the same media players or editors as does the originating device 104. In addition, the destination devices 106 may or may not include the codecs appropriate for rendering the source media 118. In cases where the source media is to be distributed to numerous different destination devices 106, achieving media compatibility across all these destination devices 106 may be a challenge.

To address these compatibility issues, the media portability tools 116 may transform or convert the source media 118 into instances of portable media more compatible with the destination devices 106. FIG. 1 denotes examples of this portable media at 120a and 120n (collectively, portable media 120), as associated respectively with the destination devices 106a and 106n. More specifically, the media portability tools 116 may transform the source media 118 into the portable media 120a and 120n, as appropriate to make the media more suitable for presentation on the destination devices 106a and 106n, taking into account the particular configurations of the particular destination devices 106a and 106n. In some cases, the media portability tools 116 may operate based on expected configurations of the destination devices 106. In other cases, the media portability tools 116 may have some degree of visibility into the actual configurations of the destination devices 106.

In some implementations, but not necessarily all, the originating devices 104 may communicate with the destination devices 106 over one or more intermediate communications networks 122. Turning to the networks 122 in more detail, these networks 122 may represent any number of communications networks. For example, the networks 122 may represent local area networks (LANs), wide area networks (WANs), and/or personal area networks (e.g., Bluetooth-type networks), any of which may operate alone or in combination to facilitate operation of the tools and techniques provided in this description. The networks 122 as shown in FIG. 1 also represents any hardware (e.g., adapters, interfaces, cables, and the like), software, or firmware associated with implementing these networks, and may also represent any protocols by which these networks may operate.

Figure 2:
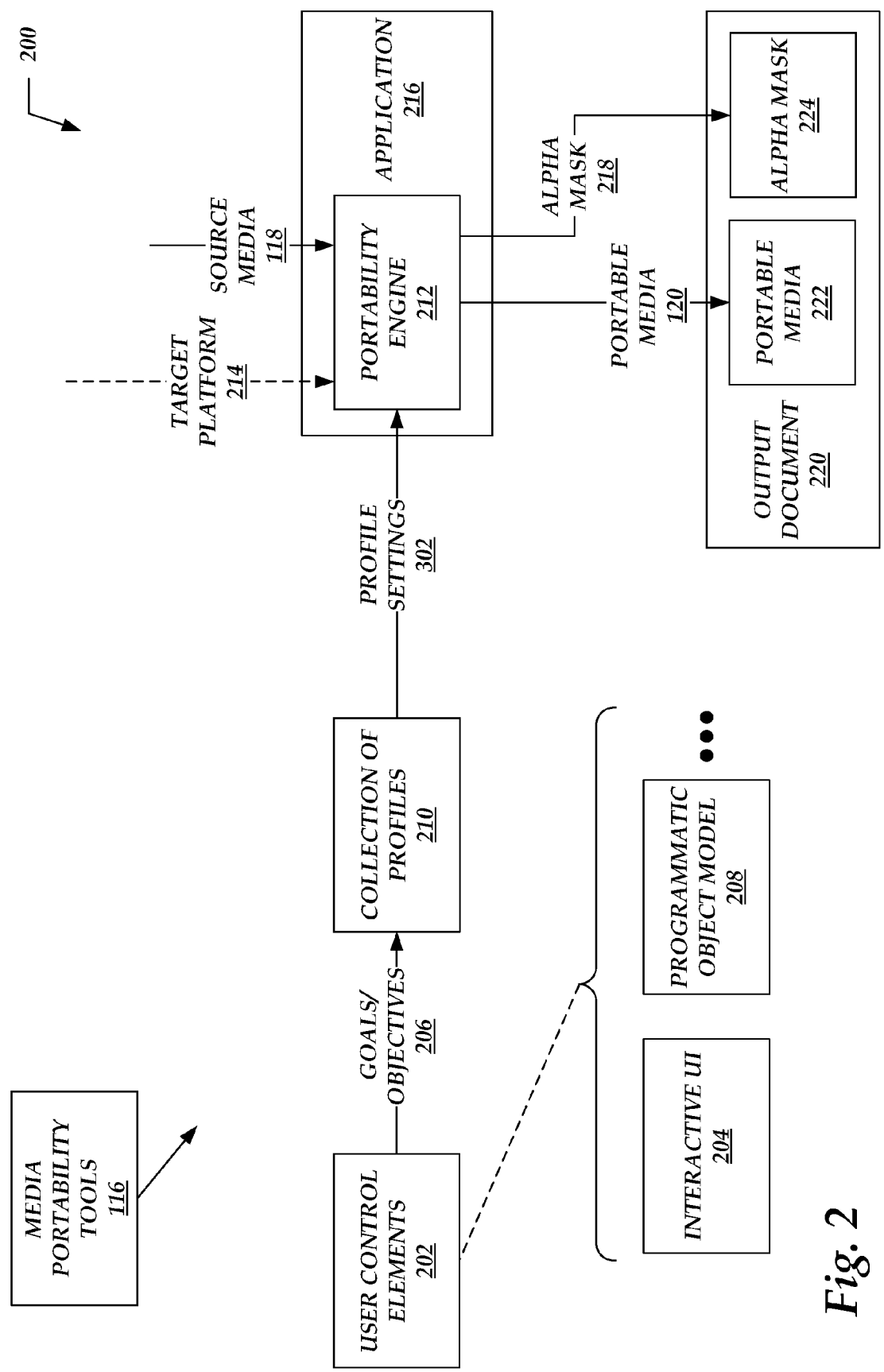
FIG. 2 is a combined block and flow diagram illustrating components and data flows provided by media portability tools.

FIG. 2 illustrates components and data flows, denoted generally at 200, provided by the media portability tools 116 shown in FIG. 1. For ease of reference, but not to limit possible implementations, FIG. 2 carries forward example source media at 118 and carries forward example portable media at 120, both of which were described above in FIG. 1.

Turning to FIG. 2 in more detail, the media portability tools 116 may include user control elements 202. In general, these user control elements enable the media portability tools 116 to gather or obtain any input parameters that control transformation of the source media 118 into portable media 120. As shown in FIG. 2, some implementations of the user control elements 202 may include an interactive user interface (UI), represented generally at 204. Through this user interface 204, the media portability tools 116 may obtain input from the user 102 regarding particular goals and/or objectives relevant to a particular transformation process. FIG. 2 denotes these goals/objectives at 206.

In other implementations, the user control elements 202 may include a programmatic object model, represented generally at 208. The programmatic object model 208 may automatically or programmatically determine the goals/objectives 206, based on data representing actual or expected configurations of the destination devices 106.

The media portability tools 116 may define a collection of transformation profiles, denoted generally at 210. To elaborate further on the transformation profiles 210, the discussion turns to FIG. 3, before returning to complete the description of FIG. 2.

Figure 3:
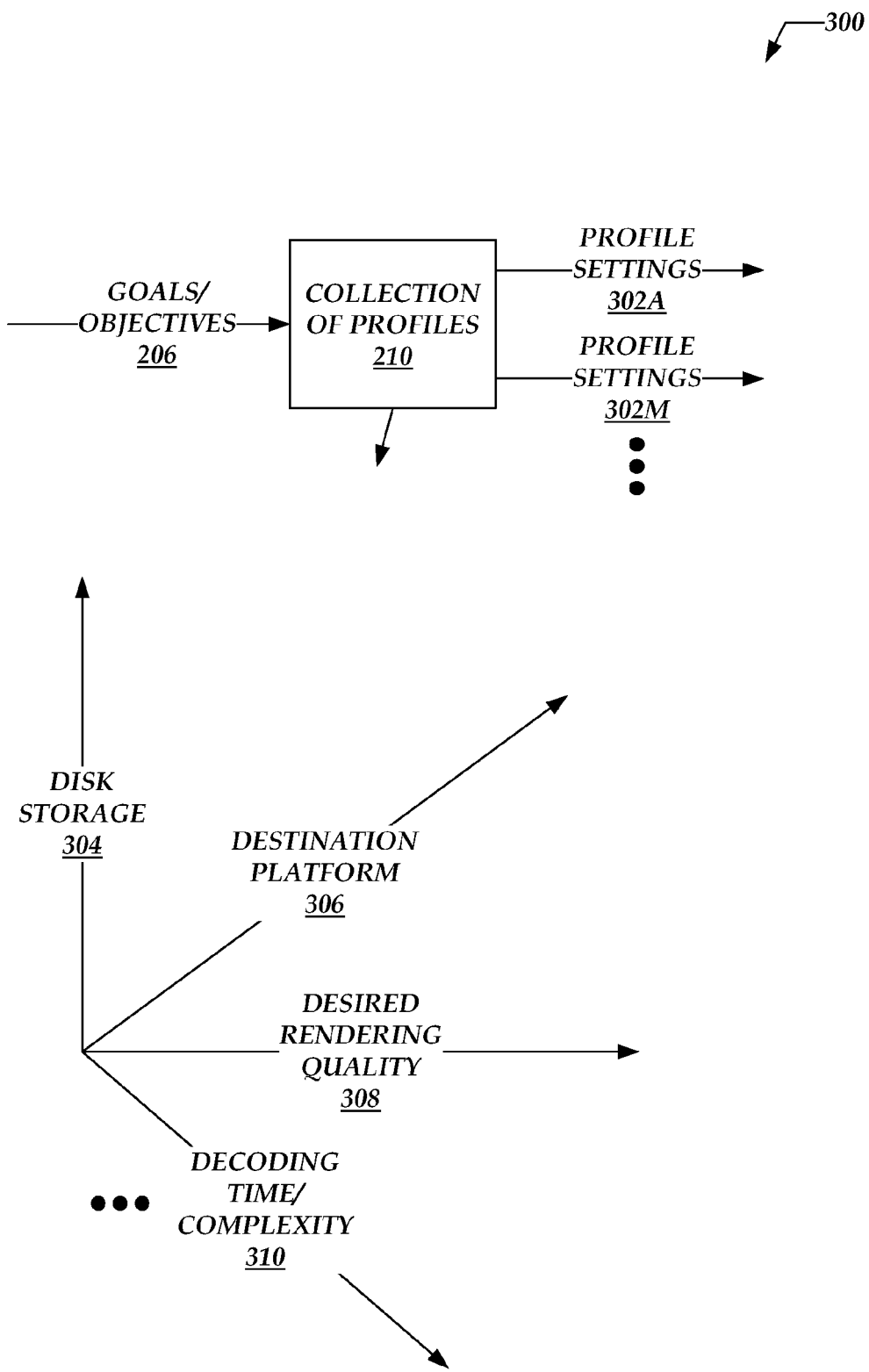
FIG. 3 is a diagram illustrating examples of different factors that may be considered when establishing profiles in connection with providing media portability and compatibility for different destination platforms.

FIG. 3 illustrates examples of different factors, denoted generally at 300, that may be considered when establishing transformation profiles 210 in connection with providing media portability and compatibility for different destination platforms. For ease of reference, but not to limit possible implementations, FIG. 3 carries forward from FIG. 2 examples of the goals/objectives 206 and the collection of profiles 210.

Turning to FIG. 3 in more detail, the collection of profiles 210 may include a plurality of different profile settings, with FIG. 3 illustrating two examples at 302a and 302m (collectively, profile settings 302). These profile settings 302 may represent trade-offs between any number of different factors of interest or priority in different particular transformations of the source media 118.

FIG. 3 provides examples in which different factors or criteria are presented along respective axes 304, 306, 308, and 310. This discussion provides these examples axes and related factors or criteria only to facilitate this discussion. However, implementations of this description may incorporate other factors or criteria without departing from the scope and spirit of this description.

In the visual representation of these axes as shown in FIG. 3, the axis 304 represents disk resources involved in storing a given instance of portable media 120. For example, at one extreme, the axis 304 may represent relatively large files containing the portable media 120, and at another extreme, the axis 304 may represent relatively small files. Points between these two extremes may represent files of any convenient intermediate sizes.

The axis 306 represents different types of destination platforms for characterizing the destination devices 106. For example, some destination devices 106 may be PC-based computing platforms that run WINDOWS®-brand operating systems. Particular types of media players and/or codecs may be expected to provide better performance within such computing platforms. Other destination devices 106 may be APPLE®-based computing platforms that run different operating systems. Other types of media players and/or codecs may be expected to provide better performance within these latter computing platforms. Accordingly, any number of different computing platforms may be visualized along the axis 306.

The axis 308 represents a rendering quality desired when presenting the portable media 120 on the different destination devices 106. For example, some destination devices 106 may have physical or operational characteristics that support only a certain level of rendering quality. Accordingly, it may be possible to reduce the file size of the portable media 120 sent to such destination devices 106. On the other hand, other destination devices 106 may be configured to benefit from "full-size" or "high quality" portable media 120. In general, any number of different degrees of rendering quality may be visualized along the axis 308.

The axis 310 represents time and/or computational complexity involved with decoding the portable media 120 on the various destination devices 106. For example, different codecs may involve different degrees of computational complexity while encoding and/or decoding media using those codecs. In some cases, certain destination devices 106 may not possess sufficient computing capability to decode portable media 120 encoded with computationally-intensive codecs. Accordingly, the media portability tools 116 may choose particular codecs depending upon the computing power possessed by different destination devices 106. Accordingly, the axis 310 any number of different codecs or other encoding schemes having different levels of complexity may be visualized along the axis 310.

The different factors or criteria shown along the axes 306-310 may be relatively independent from one another in some cases. In other cases, however, different factors may be balanced or traded off against one another. For example, one criteria of interest in performing some transformations is the file size of the portable media 120 after the transformation is complete. Certain types of media (e.g., video) consume relatively large amounts of storage. In cases where the originating devices 104 communicate with destination devices 106 over a network 122, as shown in FIG. 1, transmitting large video files may consume significant amounts of network bandwidth. Furthermore, in some cases, particular destination devices 106 may provide a reasonable video playback experience, even if the file size of the source media 118 is reduced to some degree in producing the portable media 120. This reduced file size may provide additional benefits, in that the portable media may consume less storage when loaded into the destination devices 106, as well as consuming less bandwidth when transmitted over the networks 122. Thus, in some cases, smaller file sizes may be traded off against reduced rendering quality however, implementations of this description may address any number of different scenarios in which certain factors are traded off against other factors.

FIG. 3 illustrates two profile settings 302a and 302m only for convenience of illustration and description. However, any number of profile settings 302 are possible in different implementations. In general, the profile settings 302 represent technical settings that realize the goals or objectives 206 specified for a particular media transformation, considering the various illustrative factors shown in FIG. 3.

Returning to FIG. 2, representative profile settings are carried forward at 302. The media portability tools 116 may include a portability engine 212, which receives the input source media 118, and transforms the source media 118 according to the profile settings 302. In addition, the portability engine 212 may receive an indication, denoted generally at 214, of a particular target platform for which the source media 118 is being transformed. This indication of target platform 214 may represent any of the destination devices 106, at any level of appropriate detail. For example, the target platform 214 may represent the destination devices 106 relatively generically (e.g., a WINDOWS® system or a Mac® system), or may represent the destination devices 106 more specifically. In example scenarios, the destination device 106a may be represented as a system having a relatively powerful processor, video card, memory, or other configuration elements, while the destination device 106n may be represented as a system having a more moderately powered processor, video card, etc. In addition, the indication of target platform 214 may represent expected or actual configurations for the destination devices 106.

In some cases, the portability engine 212 may be a stand-alone component. However, in other scenarios, such as those shown in FIG. 2, the portability engine 212 may be integrated into another application, represented generally at 216. This application 216 may be configured to allow users 102 to invoke the capability provided by the portability engine 212 from within the application 216. Examples of the application 216 may include, but are not limited to, presentation software, word processing software, database or spreadsheet software, and the like. In general, the application 216 may represent any application software into which media may be included or embedded.

The portability engine 212 may produce different outputs in different implementation scenarios. For example, FIG. 2 carries forward the portable media 120 as an illustrative output of the portability engine 212. In addition, however, the portability engine 212 may generate and output an alpha mask, denoted generally at 218. The alpha mask 218 may enable application of several types of post-transformation effects, without re-computing the transformation of the source media 118 to the portable media 120. Illustrative but non-limiting examples of these effects may include providing three-dimensional (3-D) visual effects, introducing glow or highlight, changing colors, adjusting transparency, and the like.

In scenarios in which the portability engine 212 is integrated with the application 216, the application 216 may generate an output document 220. This output document 220 may include one or more instances of embedded portable media, as represented at 222. In some implementations, the output document 220 may also include one or more instances of alpha masks 224, which may be associated with corresponding embedded portable media 222.

In those implementations that incorporate the alpha mask 218, the portable media 120 may be an intermediate result that may or may not be the final viewable result that is presented on the destination devices 106. In some cases, the destination devices 106 may apply the alpha mask to the intermediate result to generate the final result. In this manner, the alpha masks 218 may provide greater flexibility on the destination machine, by providing for a variety of different visual effects starting from the same media transformation.

For example, the portability engine 212 may transform the source media 118 into portable media 120 that has a certain transparency level. In addition, the portability engine may define a related alpha mask 218 that has another transparency level. The portability engine 212 may embed both the portable media 222 and the alpha mask 224 into an output document 220, which is then sent to any number of destination devices 106.

Having received the output document 220, the destination device 106 may combine the embedded portable media 222 with the embedded alpha mask 224, to achieve yet another transparency level resulting from this combination. In addition, different alpha masks 224 have a different transparencies may provide for different combined transparencies. This example illustrates one scenario out of many facilitated by alpha mask 218.

Figure 4:
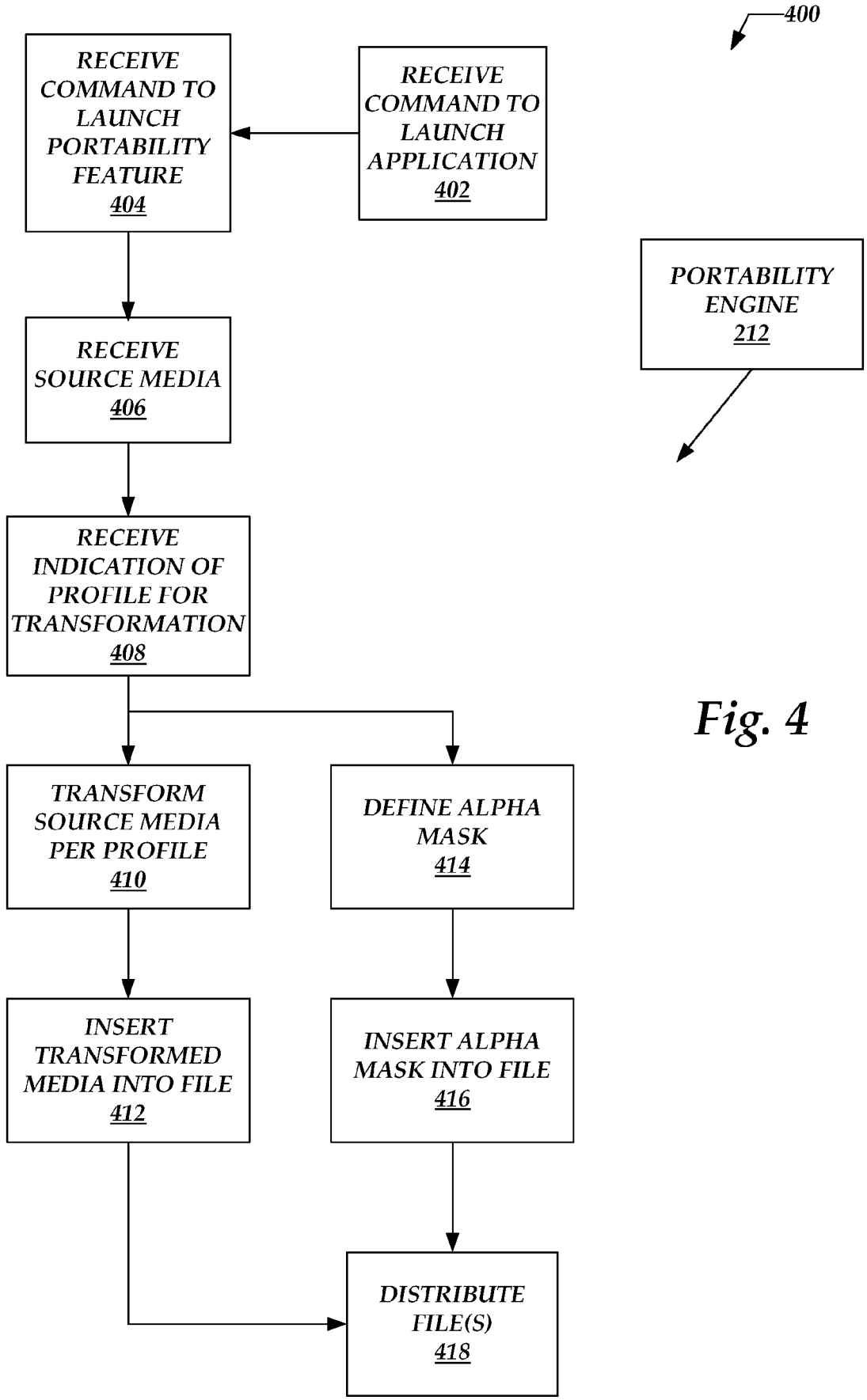
FIG. 4 is a flow diagram illustrating process flows related to media portability and compatibility for different destination platforms.

FIG. 4 illustrates process flows, denoted generally at 400, related to media portability and compatibility for different destination platforms. To facilitate this description, but not to limit possible implementations, the process flows 400 are described in connection with the portability engine 212 described above in FIG. 2. However, implementations of this description may perform at least portions of the process flows 400 with other components, without departing from the scope and spirit of this description.

Turning to the process flows 400 in more detail, block 402 represents receiving a command to launch an application (e.g., 216 in FIG. 2) that integrates the capabilities provided by the media portability tools 116. As described above, the portability engine 212 may be a stand-alone component, or may also be integrated into an application. Stand-alone implementations of the portability engine 212 may omit block 402.

Block 404 represents receiving a command to launch the portability features as provided in this description. In scenarios in which the portability engine 212 is integrated into another application, block 404 may include receiving a command issued within that application to launch the portability features. In scenarios in which the portability engine 212 is a stand-alone component, block 404 may include receiving a command issued directly to that stand-alone component.

Block 406 represents receiving one or more instances of source media for transformation. FIG. 1 provides examples of source media at 118. As noted above, the source media 118 is typically compatible with the originating device 104, but may or may not have optimum compatibility with the destination devices 106.

Block 408 represents receiving an indication of a suitable profile for transforming the source media received in block 406. FIG. 3 described above provides various examples of profile settings 302 that implement the goals or objectives 206 relevant to transforming a given instance of source media. Accordingly, block 408 may include any number of different factors or criteria relevant to such a transformation, including but not limited to any of the factors represented on the axes 304-310 shown in FIG. 3.

Block 410 represents transforming the source media into portable media per the profile setting established in block 408. Block 410 may generate as output the portable media 120 as shown in FIG. 1.

In turn, block 412 represents inserting or embedding the transformed media into an output file or document. For example, FIG. 2 illustrates an example output document at 220, which contains the embedded portable media 222. In scenarios in which the portability engine 212 is integrated into an application 216, block 412 may include embedding the transformed media into an output document as generated by that application 216. In scenarios in which the portability engine 212 is a stand-alone component, block 412 may include generating an output file that includes only the transformed media.

Block 414 represents defining an alpha mask associated with the transformed source media. FIG. 2 provides examples of alpha mask at 218, as output from the portability engine 212.

Block 416 represents inserting or embedding the alpha mask into output file. FIG. 2 also provides examples of an alpha mask 224, as embedded into an output document 220.

Block 418 represents distributing the output file as generated by block 412 and/or 416. As noted above with FIG. 2, alpha masks 218 may or may not be associated with every instance of portable media 120. As described previously with FIG. 1, block 418 may include distributing instances of portable media 120 to any number of destination devices 106.

The foregoing description provides technologies for media portability and compatibility for different destination platforms. Although the this description incorporates language specific to computer structural features, methodological acts, and computer readable media, the scope of the appended claims is not necessarily limited to the specific features, acts, or media described herein. Rather, this description provides illustrative, rather than limiting, implementations. Moreover, these implementations may modify and change various aspects of this description without departing from the true spirit and scope of this description, which is set forth in the following claims.

We claim:

1. Apparatus comprising:
  a computing device; and a memory capable of storing computer-executable instructions thereon that, when loaded into the computing device and executed, cause the computing device to,
  receive at least one command to launch a media portability capability,
  receive at least one instance of source media comprising video media as input for transformation,
  automatically determine at least one profile setting based on data communicated from and representing a configuration of at least one destination system, the at least one profile setting specifying how to transform the source media for enhanced portability on the at least one destination system for playback and how to achieve a targeted visual quality when rendering the transformed media on the at least one destination system,
  transform the source media in response to the profile setting into an intermediate media result that is not a final viewable media result for presentation on any destination system,
  define a first alpha mask associated with the source media, wherein the first alpha mask specifies first visual effects for application to the intermediate media result to generate a first final media result for playback on the destination system,
  insert the intermediate media result and the first alpha mask into at least one document,
  receive at least a second instance of a source media for transformation,
  transform the second instance of the source media in response to the profile setting into a second intermediate media result that is not a final viewable media result for presentation on any destination system,
  define a second alpha mask associated with the second instance of the source media, wherein the second alpha mask specifies second visual effects for application to the second intermediate media result to generate a second final media result for playback on the destination system,
insert the second intermediate media result and the second alpha mask into the document, and distribute the document to the at least one destination system for playback of the first final media result generated by the first alpha mask on the at least one destination system, and the second final media result generated by the second alpha mask on the at least one destination system.

2. The apparatus of claim 1, further comprising instructions to receive at least one command to launch an application associated with the document.

3. The apparatus of claim 1, further comprising instructions to define the profile setting to reduce a document size of the transformed media relative to a document size of the source media.

4. The apparatus of claim 1, further comprising instructions to define the profile setting to transform the source file into a format compatible with the destination system.

5. The apparatus of claim 1, further comprising instructions to select a format for encoding the source media based on performance capabilities of the destination system.

6. The apparatus of claim 1, further comprising instructions to present an interactive user interface for obtaining the profile setting.

7. The apparatus of claim 1, further comprising instructions to define a plurality of the profile settings, wherein the profile settings represent different trade-offs between a plurality of different factors related to transforming the source media into the transformed media for distribution to the destination systems.

8. The apparatus of claim 1, further comprising instructions to:
receive an indication of at least a further profile setting for specifying how to transform the source media for enhanced portability on at least a further destination system for playback;
transform the source media in response to the further profile setting;
insert the transformed media into at least a further document associated with the software application; and distribute the document at least to the further destination system for playback.

9. A computer-implemented process comprising:
receiving at least one command to launch a media portability capability provided by a first computing system;
receiving at least one instance of source media as input for transformation on the first computing system;
automatically determining at least one profile setting based on data communicated from and representing a configuration of at least one destination system, the at least one profile setting specifying how to transform the source media comprising visual media to achieve a targeted visual quality on the at least one destination computing system for playback;
transforming the source media in response to the profile setting into an intermediate media result that is not a final viewable media result for presentation on any destination system;
define an alpha mask associated with the source media, wherein the alpha mask specifies visual effects for application to the intermediate media result to generate a final media result for playback on the destination system;
inserting the intermediate media result and the alpha mask into at least one document; and distributing the document to the at least one destination system for playback of the final media result generated by the alpha mask on the at least one destination system.

10. Apparatus comprising: a computing device; and a memory capable of storing computer-executable instructions thereon that, when loaded into the computing device and executed, cause the computing device to
receive at least one command to launch a media portability capability provided by a software application into which the media portability capability is integrated,
receive at least one instance of source media as input for transformation into portable media compatible with a plurality of destination systems,
automatically define a plurality of profile settings based on data communicated from and representing configurations of the destination systems, wherein the profile settings represent different trade-offs between a plurality of different factors related to transforming the source media into the portable media for distribution to the destination systems,
receive a selection of one of the profile settings, from the plurality of profile settings, for specifying how to transform the source media comprising video media for enhanced portability and compatibility when played back on at least one of the destination systems,
transform the source media into the portable media in response to the selected profile setting into an intermediate media result that is not a final viewable media result for presentation on any destination system,
define a first alpha mask associated with the source media, wherein the first alpha mask specifies visual effects for application to the intermediate media result to generate a first final media result for playback on the destination system,
insert the intermediate media result and the first alpha mask into at least one document associated with the software application,
receive at least a second instance of source media for transformation,
transform the second instance of the source media in response to the profile setting into a second intermediate media result that is not a final viewable media result for presentation on any destination system,
define a second alpha mask associated with the second instance of the source media, wherein the second alpha mask specifies second visual effects for application to the second intermediate media result to generate a final second media result for playback on the destination system,
insert the second intermediate media result and the second alpha mask into the document, and distribute the document at least to the destination system for playback of the final media result generated by the alpha mask on the at least one destination system, and the final second media result generated by the second alpha mask on the at least one destination system.

11. The apparatus of claim 10, further comprising instructions to:
receive an indication of at least a further profile setting for specifying how to transform the source media for enhanced portability on at least a further destination system for playback;
transform the source media in response to the further profile setting;
insert the transformed media into at least a further document associated with the software application; and distribute the document at least to the further destination system for playback.

* * * * *